United States Patent
Sen et al.

(10) Patent No.: US 7,945,667 B2
(45) Date of Patent: May 17, 2011

(54) METHOD AND APPARATUS FOR INFERRING THE PRESENCE OF STATIC INTERNET PROTOCOL ADDRESS ALLOCATIONS

(75) Inventors: Subhabrata Sen, New Providence, NJ (US); Alexandre Gerber, Madison, NJ (US); Oliver Spatscheck, Randolph, NJ (US); Ajay Todimala, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 195 days.

(21) Appl. No.: 12/338,551

(22) Filed: Dec. 18, 2008

(65) Prior Publication Data

US 2010/0161535 A1    Jun. 24, 2010

(51) Int. Cl.
*G06F 15/173* (2006.01)
*G06F 15/177* (2006.01)
*G06F 15/16* (2006.01)
*H04L 12/28* (2006.01)

(52) U.S. Cl. ......... 709/225; 709/222; 709/227; 370/254
(58) Field of Classification Search .................. None
See application file for complete search history.

(56) References Cited

U.S. PATENT DOCUMENTS

| | | | |
|---|---|---|---|
| 6,230,012 B1 * | 5/2001 | Willkie et al. | 455/435.1 |
| 7,263,070 B1 * | 8/2007 | Delker et al. | 370/254 |
| 2008/0005290 A1 * | 1/2008 | Nykanen et al. | 709/222 |
| 2008/0320119 A1 * | 12/2008 | Achan et al. | 709/222 |

OTHER PUBLICATIONS

Pravin, "Yahoo Answers 11-20-08.pdf", Nov. 20, 2008.*
Webpage extracted from WHOIS Database using http://cqcounter.com/whois query, "WhoisPage.pdf", Aug. 25, 2010.*
Webpage on Messengeroo.com, "Yahoo Messenger.pdf", Sep. 3, 2008.*

* cited by examiner

*Primary Examiner* — Wen-Tai Lin

(57) ABSTRACT

A method and apparatus for inferring if an IP address allocation in a remote network is static or dynamic are disclosed. For example, the method contacts at least one remote peer to peer endpoint using a peer to peer application to obtain an IP address of the at least one remote peer to peer endpoint. The method then analyzes characteristics of the at least one remote peer to peer endpoint over a predefined period of time to infer whether the presence of static IP address allocation exists for the at least one remote peer to peer endpoint.

19 Claims, 5 Drawing Sheets

METHOD AND APPARATUS FOR INFERRING THE PRESENCE OF STATIC INTERNET PROTOCOL ADDRESS ALLOCATIONS

The present invention relates generally to communication network and, more particularly, to a method and apparatus for inferring the presence of static Internet Protocol (IP) address allocations using peer to peer communications.

BACKGROUND OF THE INVENTION

Internet Service Provider (ISP) can assign an IP address to a subscriber statically or dynamically. In the case of a dynamic allocation, a subscriber will receive a different IP address every time when connecting to the Internet through the provider. The use of dynamic IP addresses makes the coupling between a host and an IP address transient. This makes it very difficult to track behavior of hosts which are in remote networks across time. For instance, the tracking of a malicious host across time becomes very difficult as its IP address changes. This IP address dynamics makes it very difficult to build effective historical behavior based profiles and policies for network management, policing, security, usage tracking and targeted advertising purposes.

SUMMARY OF THE INVENTION

In one embodiment, the present invention enables a method and apparatus for inferring if an IP address allocation in a remote network is static or dynamic. For example, the method contacts at least one remote peer to peer endpoint using a peer to peer application to obtain an IP address of the at least one remote peer to peer endpoint. The method then analyzes characteristics of the at least one remote peer to peer endpoint over a predefined period of time to infer whether the presence of static IP address allocation exists for the at least one remote peer to peer endpoint.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
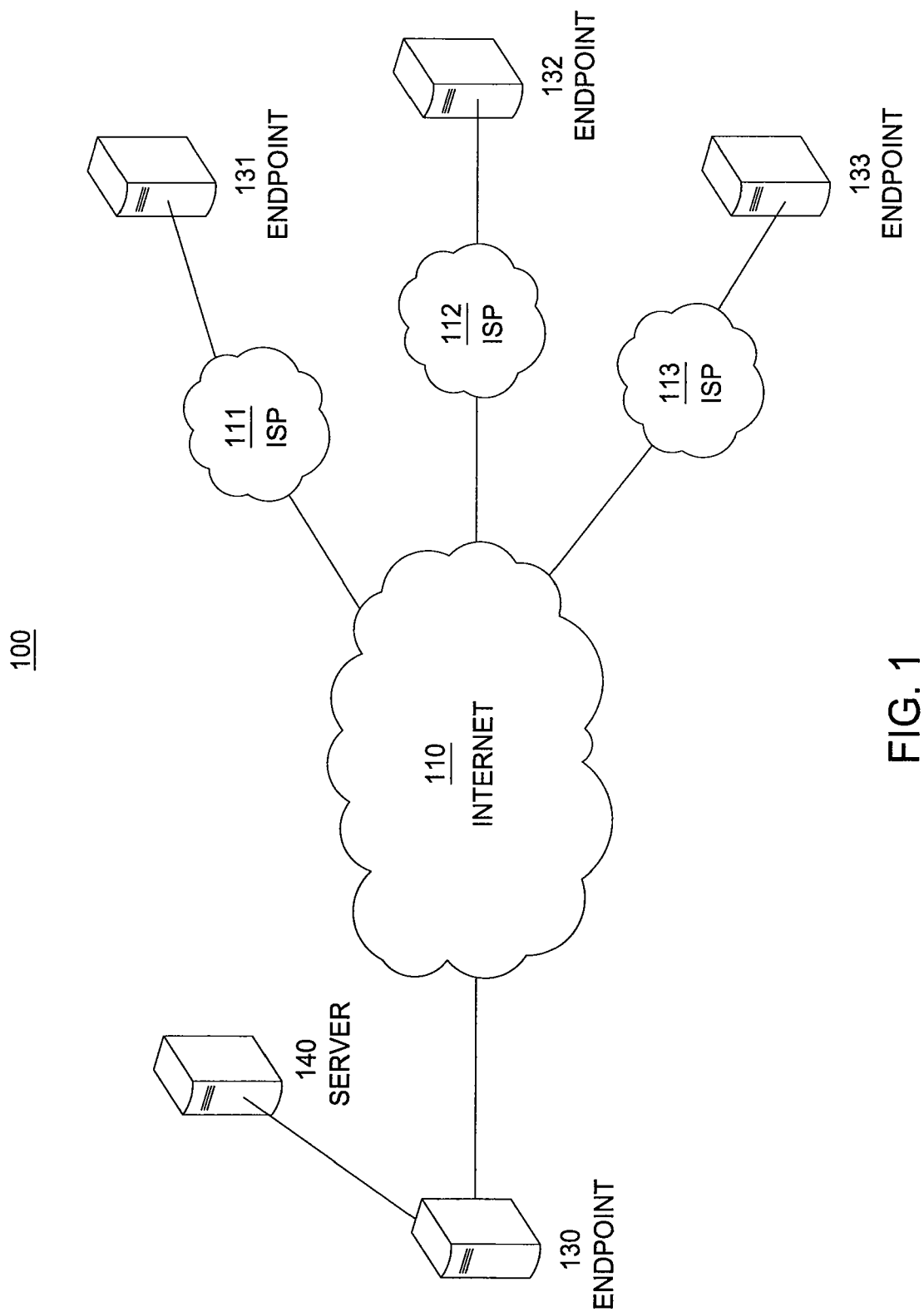
FIG. 1 illustrates an exemplary communication network, e.g., packet networks such as IP networks, that support peer to peer communications related to the present invention.

As discussed above, Internet Service Provider (ISP) can assign an IP address to a subscriber statically or dynamically. The use of dynamic IP addresses makes the coupling between a host and an IP address transient, thereby making it very hard to track behavior of hosts which are in remote networks across time.

For instance, a particular malicious host may have moved on to a new IP address, but if its earlier IP address is blocked, then an innocent host can get blocked afterwards if it gets assigned the same IP address previously used by the malicious host. Therefore, knowing whether a particular part of the IP address space uses static (and not dynamic) IP address bindings is very valuable to enable and facilitate tracking of hosts in those IP address space across time which, in turn, enables the development of more accurate behavior based profiles for driving network management, policing, security, usage tracking and targeted advertising purposes.

To address this need, the present invention enables the presence of static Internet Protocol (IP) address allocations to be inferred using peer to peer communications. In one embodiment, the present invention enables a method and apparatus for inferring if an IP address allocation in a remote network is static or dynamic. In order to determine if an ISP is using static or dynamic allocation of IP addresses, one can study information provided by peer to peer (P2P) protocols.

Peer to peer protocols are widely used by end users worldwide, and by actively participating in these P2P protocols, one can gather information provided by each IP address over time and determine if the same P2P users are allocated different IP addresses. In one embodiment, the present invention does not require active probing of the address space in a remote network, which can be heavyweight and intrusive and may even trigger a response from an Intrusion Detection System (IDS) in the remote network. The present invention is lightweight and nonintrusive and depends on inferring the static versus dynamic address allocation policy based on an analysis of the observed behavior or characteristics across time of subsets of machines from the remote network that are participating in a P2P network. In other words, all the communications needed are conducted in the context of standard P2P message exchanges, e.g., the needed information is extracted based on information shared by these remote machines as part of their normal P2P communications.

In one embodiment, the present invention enables a network provider to infer if certain remote providers are actually using static bindings between a host machine and an IP address. Knowledge of whether an ISP or a part of an IP address space uses static bindings can be enormously beneficial to network management and security, by allowing the development of IP address based reputation mechanisms (e.g., black and white lists). Furthermore, it enables the ability to track host behavior across time based on IP addresses which has applications in network analytics, profiling and targeted advertising.

In one embodiment, the present invention enables the presence of static Internet Protocol (IP) address allocations to be inferred using peer to peer communications, e.g., by actively participating in P2P networks by contacting remote peers and collecting their responses (broadly defined as characteristics of the remote peer to peer endpoint). The present invention analyzes these responses to see whether a unique P2P user has been assigned different IP addresses or whether an IP address seems to be used by different P2P users.

In one embodiment, responses from a remote peer with a unique user identifier (ID) are monitored over time to determine if the unique user ID is always bound to the same IP address. If the IP address and the user ID binding remains constant over time, then the remote peer is inferred as having a static IP address.

In another embodiment, responses from a remote peer without a unique user ID are monitored over time to determine if the set of contents available from the IP address used by the remote peer contains the same set of contents over time. If the IP address and the set of contents mapping remains constant over time, then the remote peer is inferred as having a static IP address.

In a third embodiment, responses from a remote peer without a unique user ID are monitored over time to determine if the port used for the P2P applications of the IP address used by the remote peer remains the same over time. If the IP address and the P2P application protocol port mapping remains constant over time, then the remote peer is inferred as having a static IP address.

FIG. 1 illustrates an exemplary communication network 100, e.g., packet networks such as IP networks, that support peer to peer communications related to the present invention. In FIG. 1, endpoint 130 (e.g., an endpoint device such as a computer, a laptop, a server, and the like) is a host used by a network provider to investigate the presence of static IP address mapping of a remote P2P endpoint. It should be noted that the novel methods as discussed below for inferring the presence of static Internet Protocol (IP) address allocations can be implemented in the endpoint 130 or at a separate application server 140.

For example, endpoint 130 is connected to Internet 110. Endpoints 131, 132, and 133 are remote P2P endpoints that are connected to the Internet 110 via Internet Service Provider (ISP) 111, 112, and 113, respectively. Each ISP has its own IP address allocation policy that is to be investigated by endpoint 130.

In a first example, endpoint 130 may contact endpoint 131 using a P2P application, (e.g., including by not limited to P2P file sharing, a voice call, or video call applications) and determines that the remote user of endpoint 131 has a unique user ID. Endpoint 130 also obtains the IP address of endpoint 131 through the P2P communications. If the binding of the unique user ID and IP address is observed over time and the binding remains constant, then endpoint 131 can be inferred as having a static IP address; otherwise, endpoint 131 can be inferred as having a dynamic IP address assignment that changes over time.

In a second example, endpoint 130 may contact endpoint 132 using a P2P application, (e.g., including by not limited to P2P file sharing, a voice call, or video call applications) and determines that the remote user of endpoint 132 has no user ID. Endpoint 130 obtains the IP address of endpoint 132 through the P2P communications. However, endpoint 130 also records the set of contents that is available from the endpoint 132 during the first contact. If the IP address and the set of contents mapping is observed over time and the mapping remains constant, then endpoint 132 can be inferred as having a static IP address; otherwise, endpoint 132 can be inferred as having a dynamic IP address assignment that changes over time.

In a third example, endpoint 130 contacts endpoint 133 using a P2P application, (e.g., including by not limited to P2P file sharing, a voice call, or video call applications) and determines that the remote user of endpoint 133 has no user ID. Endpoint 130 obtains the IP address of endpoint 133 through the P2P communications. However, endpoint 130 also records the protocol port used by endpoint 133 to support the P2P communications during the first contact. If the IP address and the P2P protocol port mapping is observed over time and the mapping remains constant, then endpoint 133 can be inferred as having a static IP address; otherwise, endpoint 133 can be inferred as having a dynamic IP address assignment that changes over time.

Figure 2:
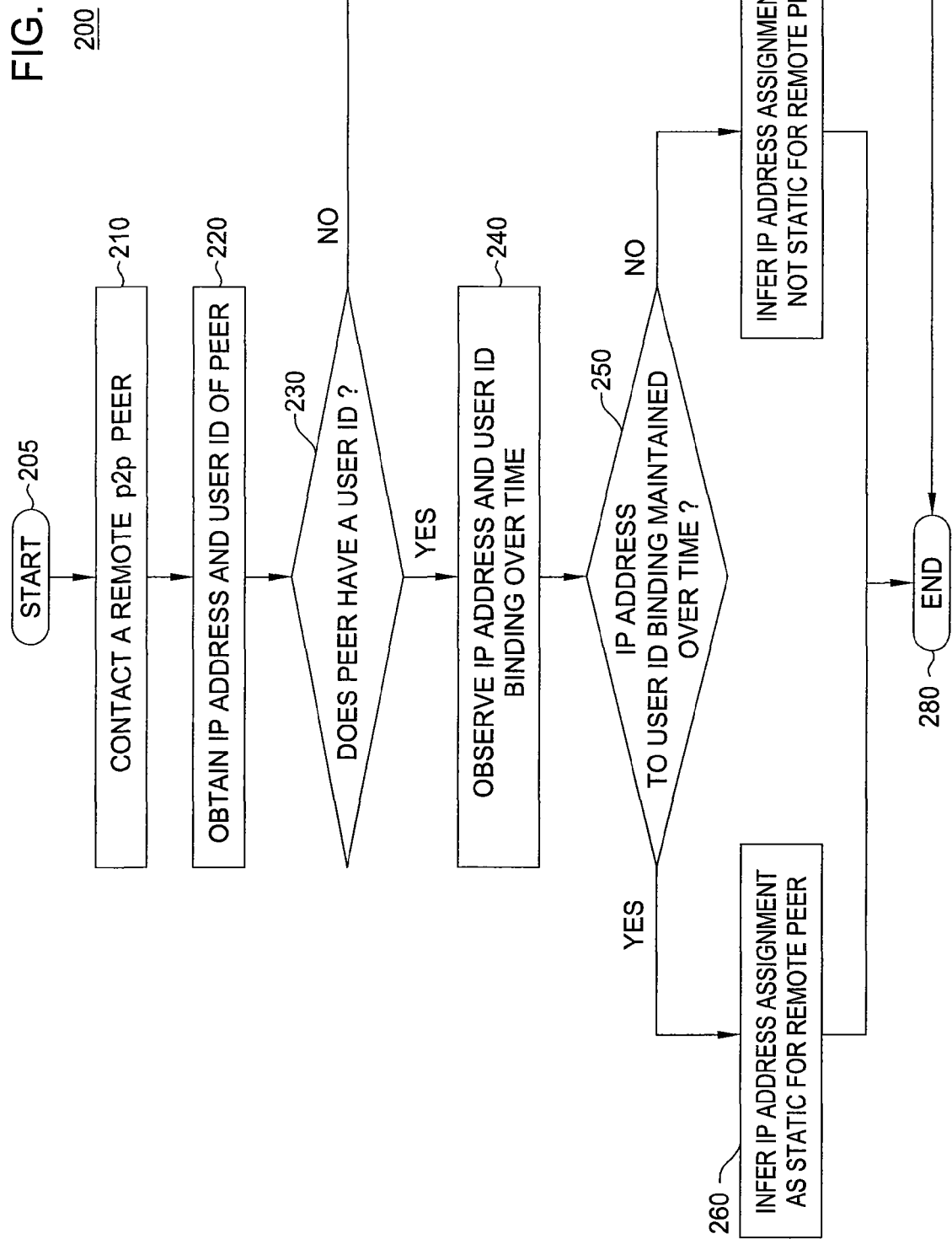
FIG. 2 illustrates a flowchart of a method of a first embodiment for inferring the presence of static Internet Protocol (IP) address allocations using peer to peer communications of the present invention.

FIG. 2 illustrates a flowchart of a method 200 of a first embodiment for inferring the presence of static Internet Protocol (IP) address allocations using peer to peer communications of the present invention. For example, one or more steps of method 200 can be implemented in an endpoint device or an application server. Method 200 starts in step 205 and proceeds to step 210.

In step 210, the method contacts a remote P2P endpoint using a P2P application. In step 220, the method obtains the IP address and a user ID used by the user of the remote P2P endpoint through the P2P communications.

In step 230, the method checks if the remote P2P endpoint has a unique user ID associated with it. If the remote P2P endpoint has a unique user ID associated with it, the method proceeds to step 240; otherwise, the method proceeds to step 280.

In step 240, the method uses the obtained unique user ID to monitor if the remote endpoint IP address of the obtained unique user ID always is bound to the obtained IP address over a predefined time interval. The predefined time interval for monitoring is a configurable parameter.

In step 250, the method checks if the IP address to unique user ID binding is maintained over time. If the IP address to unique user ID mapping is maintained over time, the method proceeds to step 260; otherwise, the method proceeds to step 270.

In step 260, the method infers that the remote endpoint uses a static IP address. In step 270, the method infers that the remote endpoint does not use a static IP address. The method ends in step 280.

Figure 3:
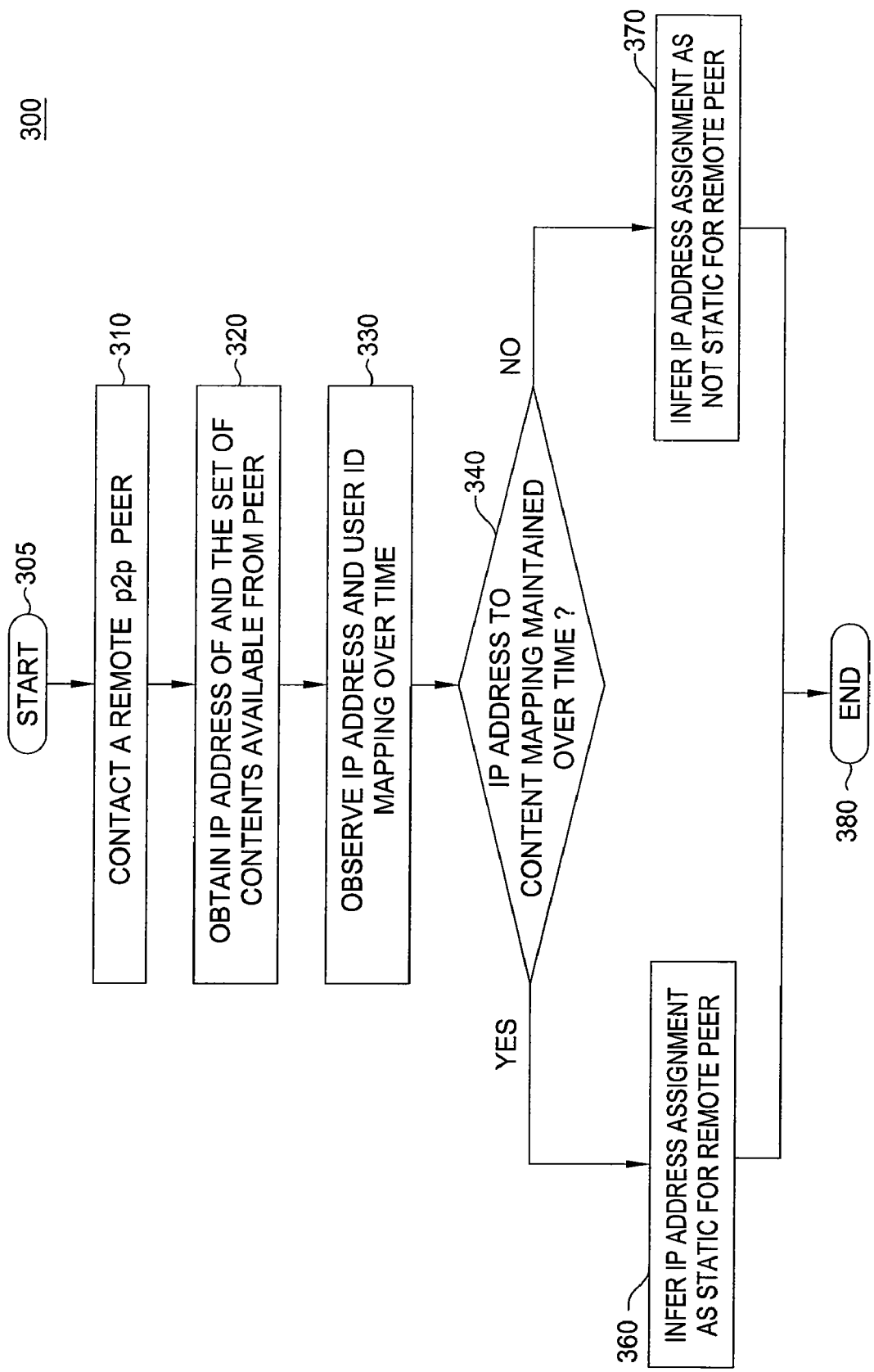
FIG. 3 illustrates a flowchart of a method of a second embodiment for inferring the presence of static Internet Protocol (IP) address allocations using peer to peer communications of the present invention.

FIG. 3 illustrates a flowchart of a method 300 of a second embodiment for inferring the presence of static Internet Protocol (IP) address allocations using peer to peer communications of the present invention. For example, one or more steps of method 300 can be implemented in an endpoint device or an application server. Method 300 starts in step 305 and proceeds to step 310.

In step 310, the method contacts a remote P2P endpoint using a P2P application. In step 320, the method obtains the IP address of the remote P2P endpoint and a set of contents available from the remote P2P endpoint through the P2P communications.

In step 330, the method uses the obtained IP address to monitor if the remote endpoint of the obtained IP address always has the same set of contents available over a predefined period of time interval. The predefined time interval for monitoring is a configurable parameter.

In step 340, the method checks if the IP address to the set of available contents mapping is maintained over time. If the IP address to the set of available contents mapping is maintained over time, the method proceeds to step 360; otherwise, the method proceeds to step 370.

In step 360, the method infers that the remote endpoint uses a static IP address. In step 370, the method infers that the remote endpoint does not use a static IP address. The method ends in step 380.

Figure 4:
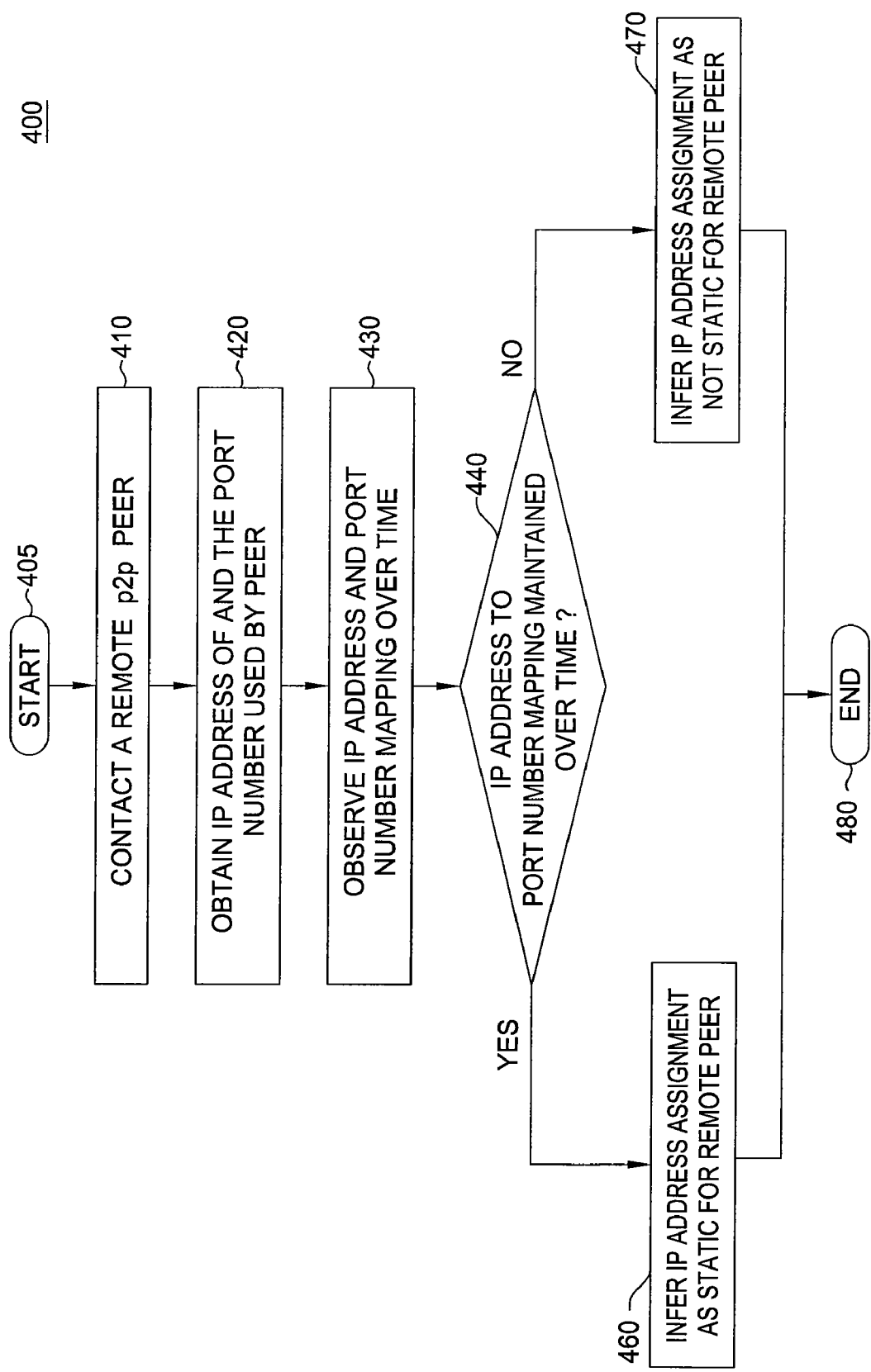
FIG. 4 illustrates a flowchart of a method of a third embodiment for inferring the presence of static Internet Protocol (IP) address allocations using peer to peer communications of the present invention.

FIG. 4 illustrates a flowchart of a method 400 of a third embodiment for inferring the presence of static Internet Protocol (IP) address allocations using peer to peer communications of the present invention. For example, one or more steps of method 400 can be implemented in an endpoint device or an application server. Method 400 starts in step 405 and proceeds to step 410.

In step 410, the method contacts a remote P2P endpoint using a P2P application. In step 420, the method obtains the IP address of the remote P2P endpoint and the protocol port number for P2P communications used by the remote P2P endpoint through the P2P communications.

In step 430, the method uses the obtained IP address to monitor if the remote endpoint of the obtained IP address always uses the same protocol port number for P2P communications over a predefined period of time interval. The predefined time interval for monitoring is a configurable parameter.

In step 440, the method checks if the IP address to the protocol port number mapping is maintained over time. If the IP address to the protocol port number mapping is maintained over time, the method proceeds to step 460; otherwise, the method proceeds to step 470.

In step 460, the method infers that the remote endpoint uses a static IP address. In step 470, the method infers that the remote endpoint does not use a static IP address. The method ends in step 480.

It should be noted that although not specifically specified, one or more steps of methods 200, 300 and 400 may include a storing, displaying and/or outputting step as required for a particular application. In other words, any data, records, fields, and/or intermediate results discussed in the methods 200, 300 and 400 can be stored, displayed and/or outputted to another device as required for a particular application. Furthermore, steps or blocks in FIGS. 2, 3 and 4 that recite a determining operation, or involve a decision, do not necessarily require that both branches of the determining operation be practiced. In other words, one of the branches of the determining operation can be deemed as an optional step.

In one embodiment, once a set of individual IP addresses and their IP address allocation methods have been determined, the data can be used to infer IP address allocation policies of different remote networks. Furthermore, in one embodiment, grouping the statistics of each individual IP address into sets of IP prefixes, Border Gateway Protocol (BGP) routes or Autonomous Systems (AS) and applying a threshold (e.g., a configurable parameter) for that set of IP addresses can help determine if that set of IP addresses is using a static or dynamic IP address allocation. For example, the threshold can be set as a percentage value, e.g., 90% of the IP prefixes, Border Gateway Protocol (BGP) routes or Autonomous Systems (AS) and so on.

Figure 5:
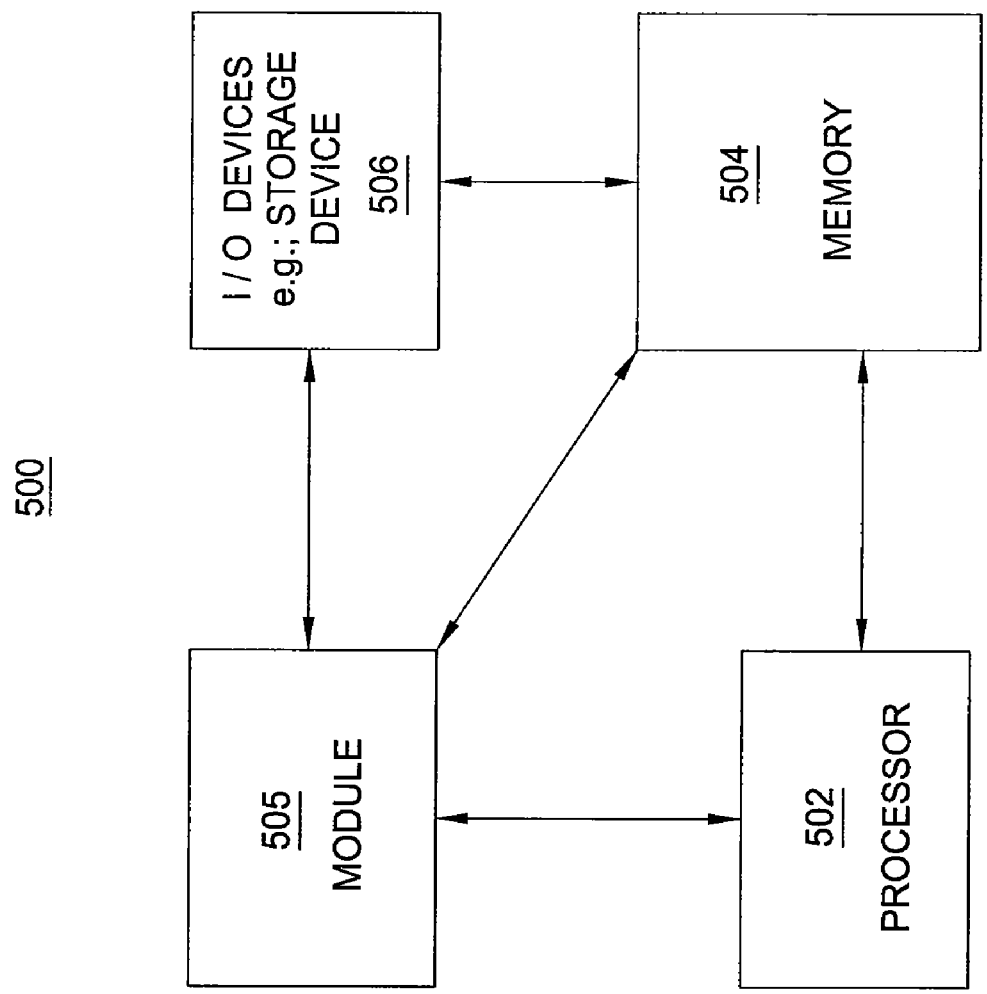
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for inferring the presence of static Internet Protocol (IP) address allocations using peer to peer communications, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for inferring the presence of static Internet Protocol (IP) address allocations using peer to peer communications can be loaded into memory 504 and executed by processor 502 to implement the functions as discussed above. As such, the present process 505 for inferring the presence of static Internet Protocol (IP) address allocations using peer to peer communications (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for inferring a presence of a static internet protocol address allocation, comprising:
    contacting a remote peer to peer endpoint using a peer to peer application to obtain an internet protocol address of the remote peer to peer endpoint;
    analyzing, via a processor, characteristics of the remote peer to peer endpoint over a predefined period of time to infer whether the presence of the static internet protocol address allocation exists for the remote peer to peer endpoint; and
    grouping statistics of each of the internet protocol address for the remote peer to peer endpoint that has been inferred as using the static internet protocol address allocation into a set of internet protocol prefixes.

2. The method of claim 1, wherein analyzing the characteristics comprises:
    analyzing a binding of a unique user identifier associated with the remote peer to peer endpoint and the internet protocol address.

3. The method of claim 2, wherein if the binding of the unique user identifier associated with the remote peer to peer endpoint and the internet protocol address remains constant over the predefined period of time, then the remote peer to peer endpoint is inferred as using a static internet protocol address.

4. The method of claim 1, wherein analyzing the characteristics comprises:
    analyzing a mapping of a set of contents that is available from the remote peer to peer endpoint and the internet protocol address.

5. The method of claim 4, wherein if the mapping of the set of contents that is available from the remote peer to peer endpoint and the internet protocol address remains constant over the predefined period of time, then the remote peer to peer endpoint is inferred as using a static internet protocol address.

6. The method of claim 1, wherein analyzing the characteristics comprises:
    analyzing a mapping of a protocol port number used for peer to peer communications and the internet protocol address.

7. The method of claim 6, wherein if the mapping of the protocol port number used for the peer to peer communications and the internet protocol address remains constant over the predefined period of time, then the remote peer to peer endpoint is inferred as using a static internet protocol address.

8. The method of claim 1, further comprising:
    applying a threshold to determine if the set of: internet protocol prefixes is using the static internet protocol address allocation.

9. The method of claim 8, wherein the threshold is a configurable parameter.

10. The method of claim 1, wherein the predefined period of time is a configurable parameter.

11. A non-transitory computer-readable medium having stored thereon a plurality of instructions, the plurality of instructions including instructions which, when executed by a processor, cause the processor to perform a method for inferring a presence of a static internet protocol address allocation, comprising:
- contacting a remote peer to peer endpoint using a peer to peer application to obtain an internet protocol address of the remote peer to peer endpoint;
- analyzing characteristics of the remote peer to peer endpoint over a predefined period of time to infer whether the presence of the static internet protocol address allocation exists for the remote peer to peer endpoint; and
- grouping statistics of each of the internet protocol address for the remote peer to peer endpoint that has been inferred as using the static internet protocol address allocation into a set of internet protocol prefixes.

12. The non-transitory computer-readable medium of claim 11, wherein analyzing the characteristics comprises:
- analyzing a binding of a unique user identifier associated with the remote peer to peer endpoint and the internet protocol address.

13. The non-transitory computer-readable medium of claim 12, wherein if the binding of the unique user identifier associated with the remote peer to peer endpoint and the internet protocol address remains constant over the predefined period of time, then the remote peer to peer endpoint is inferred as using a static internet protocol address.

14. The non-transitory computer-readable medium of claim 11, wherein analyzing the characteristics comprises:
- analyzing a mapping of a set of contents that is available from the remote peer to peer endpoint and the internet protocol address.

15. The non-transitory computer-readable medium of claim 14, wherein if the mapping of the set of contents that is available from the remote peer to peer endpoint and the internet protocol address remains constant over the predefined period of time, then the remote peer to peer endpoint is inferred as using a static internet protocol address.

16. The non-transitory computer-readable medium of claim 11, wherein analyzing the characteristics comprises:
- analyzing a mapping of a protocol port number used for peer to peer communications and the internet protocol address.

17. The non-transitory computer-readable medium of claim 16, wherein if the mapping of the protocol port number used for the peer to peer communications and the internet protocol address remains constant over the predefined period of time, then the remote peer to peer endpoint is inferred as using a static internet protocol address.

18. The non-transitory computer-readable medium of claim 11, further comprises:
- applying a threshold to determine if the set of: internet protocol prefixes, border gateway protocol routes, or autonomous systems, is using the static internet protocol address allocation.

19. An apparatus for inferring a presence of a static internet protocol address allocation, comprising:
- means for contacting a remote peer to peer endpoint using a peer to peer application to obtain an internet protocol address of the remote peer to peer endpoint;
- means for analyzing characteristics of the remote peer to peer endpoint over a predefined period of time to infer whether the presence of the static internet protocol address allocation exists for the remote peer to peer endpoint; and
- means for grouping statistics of each of the internet protocol address for the remote peer to peer endpoint that has been inferred as using the static internet protocol address allocation into a set of internet protocol prefixes.

* * * * *